United States Patent Office 2,719,854
Patented Oct. 4, 1955

2,719,854

1-(5-ALKYLSULFONYL-2-FURYL)-2-AMIDO-1,3-PROPANEDIOLS AND PREPARATION OF SAME

Algird Kreuchunas, Wilmington, Del., assignor to E. I. du Pont de Nemours and Company, Wilmington, Del., a corporation of Delaware No Drawing. Application September 12, 1952,
Serial No. 309,370

8 Claims. (Cl. 260—347.2)

This invention relates to 1-(5-alkylsulfonyl-2-furyl)-2-amido-1,3-propanediols and to a method for their preparation.

The 1-(5-alkylsulfonyl-2-furyl)-2-amino-1,3-propanediols of my invention conform to the formula

1.

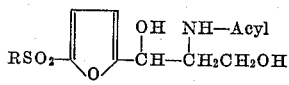

where R represents a lower alkyl radical, that is 1 to 5 carbon atoms, and acyl represents a radical such as acetyl, chloroacetyl, bromoacetyl, dichloroacetyl, dibromoacetyl, alpha-methylsulfonylacetyl and the like.

As exemplary of such compounds there may be mentioned:

1-(5-methylsulfonyl-2-furyl)-2-(alpha,alphadichloroacetamido)-1,3-propanediol
1-(5-ethylsulfonyl-2-furyl)-2-(alpha,alphadichloroacetamido)-1,3-propanediol
1-(5-n-propylsulfonyl-2-furyl)-2-(alpha,alphadichloroacetamido)-1,3-propanediol
1-(5-isopropylsulfonyl-2-furyl)-2-(alpha,alphadichloroacetamido)-1,3-propanediol
1-(5-n-butylsulfonyl-2-furyl)-2-(alpha,alphadichloroacetamido)-1,3-propanediol
1-(5-methylsulfonyl-2-furyl-2-acetamido-1,3-propanediol
1-(5-methylsulfonyl-2-furyl)-2-(alpha-chloroacetamido)-1,3-propanediol
1-(5-methylsulfonyl-2-furyl)-2-(alpha-bromoacetamido)-1,3-propanediol
1-(5-methylsulfonyl-2-furyl)-2-(alpha,alphadibromoacetamido)-1,3-propanediol
1-(5-methylsulfonyl-2-furyl)-2-(alpha-methylsulfonylacetamido)-1,3-propanediol The alkylsulfonylfurylamidopropanediols of the invention can be prepared from previously known organic compounds by a novel synthetic route which I have discovered. A number of new intermediate organic compounds are involved in the steps of this synthesis.

Certain of these new intermediate compounds and all of the compounds represented by Formula 1 may exist in optical isomeric form. Stereoisomeric forms as used herein refer to the spatial arrangement of the polar groups on the two asymmetric carbon atoms with reference to erythrose and threose. To differentiate between these two possible forms the convention will be employed herein which designates the diastereoisomeric pair related to erythrose in configuration as the erythro form, and the diastereoisomeric pair related to threose as the threo form.

To further designate the threo form of the compounds of this invention, I have designated as the threo form the major product obtained from the aluminum isopropoxide isopropanol reduction of ketones having the formula

2.

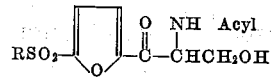

where R has the same significance as in Formula 1.

Both the threo and erythro forms exist as racemates of optically active dextro (d) and levo (l) rotatory isomers as well as in the form of the individual or separated dextro (d) and levo (l) optical isomers.

In view of the difficulty of representing the various optical isomers with plane formulas, I have used the customary structural formulas and adopted the following convention in order to designate the optical configuration, and appropriate notation is used under the formula, for example, (l)-threo form, (d)-threo form, (l)-erythro form, (d)-erythro form and (dl)-threo form and the like.

It will be understood that where no notation appears with a structural formula or with a chemical name, the formula or name is interpreted in its generic sense; that is, as representing the (d)-threo, (l)-threo isomers or (d)-erythro, (l)-erythro isomers in separated form as well as the (dl)-threo or (dl)-erythro optical isomers or the mixture of all of the isomers and racemates. In other words, a formula or name represents not only the unresolved mixture of isomers but also the individual isomers and racemates.

Using the above conventions, a method for the production of the alkylsulfonylfurylamidopropanediols of the invention can be diagrammatically represented as follows:

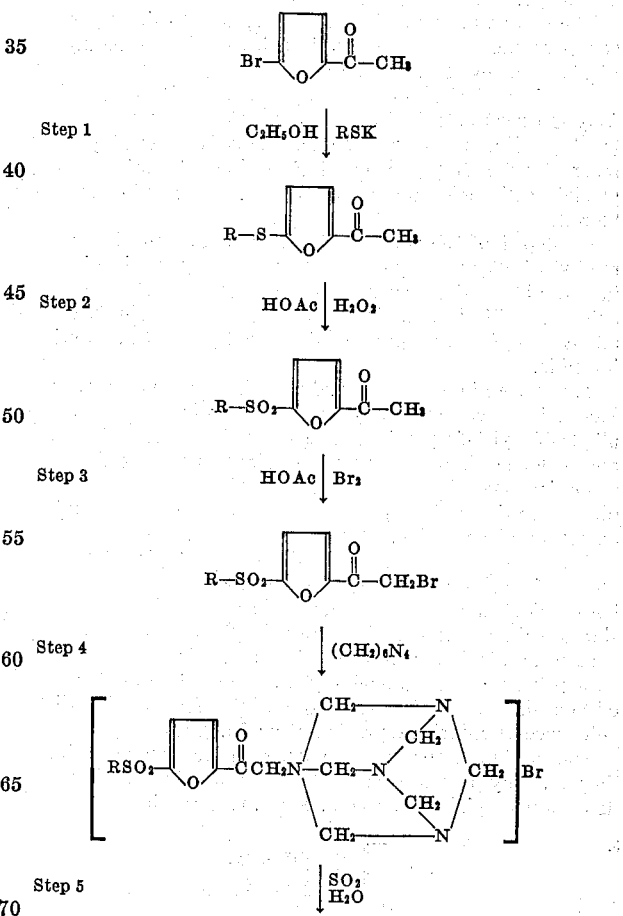

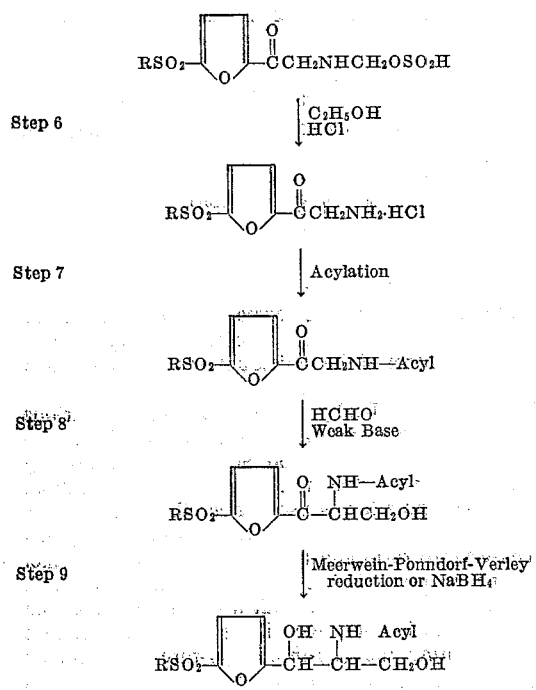

where R and acyl have the same significance as in Formula 1.

Step 1 of my process, which involves preparing a methyl (5-alkylmercapto-2-furyl) ketone by reacting 2-acetyl-5-bromofurane with an alkali metal alkyl mercaptide, such as potassium alkyl mercaptide, in a liquid alcoholic medium, is fully described and claimed in my joint copending application with Walter A. Gregory, Serial No. 298,843, filed July 14, 1952.

The ketone produced in Step 1 is oxidized using hydrogen peroxide and glacial acetic acid to yield a methyl (5-alkylsulfonyl-2-furyl) ketone.

Step 3 comprises brominating the methyl(5-alkyl-sulfonyl-2-furyl) ketone of Step 2 to produce a bromomethyl (5-alkylsulfonyl-2-furyl) ketone. This is preferably effected by the dropwise addition of liquid bromine to a glacial acetic acid solution of the ketone resulting from Step 2.

In Step 4 of the process of the invention, the bromomethyl (5-alkylsulfonyl-2-furyl) ketone of Step 3 is mixed in a liquid medium, such as, for example, ethylidene dichloride, with hexamethylenetetramine to obtain N-(5-alkylsulfonyl-2 - furoylmethyl)hexamethylenetraminium bromide.

The tetraminium salt produced in accordance with Step 4 is converted to (hydroxymethylamino)methyl (5-alkylsulfonyl-2-furyl) ketone sulfite using sulfur dioxide and water as shown on the above diagram as Step 5. In some instances it may be found preferably to proceed directly to the sulfite without isolation of the hexamethylenetetraminium halide.

The sulfite of Step 5 is readily converted into N-(5-alkylsulfonyl-2-furoyl) methylamine hydrochloride using hydrochloric acid. It is preferred to carry out this conversion of sulfite to amine hydrochloride (Step 6) in the presence of an alcohol such as absolute ethanol.

Step 7 comprises N-acylating the amine hydrochloride of Step 6. The acylation is preferably effected using dichloroacetyl chloride or a similar acid halide.

The amide derivative produced in accordance with Step 7 of my process is subjected to an aldol type of condensation to yield a compound of the formula

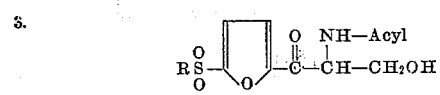

This condensation is preferably carried out in an alcoholic medium such as, for example, ethanol or methanol, using sodium bicarbonate or potassium carbonate, and an aqueous formaldehyde of 36-38% concentration.

Step 9, the final step in the process of the invention, involves a reduction of the carbonyl group of the compound produced in Step 8 to a hydroxyl group. This reduction can be effected in good yields by using either of two methods.

One method involves the use of sodium borohydride, NaBH4. It is preferred to carry out the reduction using NaBH4 in the presence of an alcohol such as, for instance, methanol or ethanol. This method yields a mixture of (dl)-threo and (dl)-erythro forms of the alkylsulfonyl-furylamidopropanediols of the invention.

The alternative method of Step 9 is referred to as the Meerwein-Ponndorf-Verly reduction. This reduction method is described by A. L. Wilds on page 205 of chapter 5 of "Organic Reactions," volume 2, John Wiley & Sons, Inc., N. Y. (1944). This method of reduction gives mainly (dl)-threo form of the 1-(5-alkylsulfonyl-2-furyl)-2-amido-1,3-propanediols of the invention.

The compounds of the present invention are useful as drugs for the control of bacterial and rickettsial infections. They are also of use in viral and fungal infections. The compounds find further use as antibacterial agents and in the control of growth of microorganisms such as, for example, yeast and fungi.

In order to better understand the invention reference should be had to the following illustrative examples. Parts given are by weight unless otherwise specified.

*Example 1*

Preparation of (dl)-threo-1-(5-methylsulfonyl-2-furyl)-2-(alpha,alpha-dichloroacetamido)-1,3-propanediol.

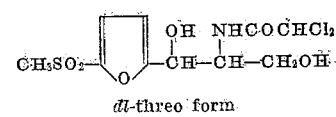

dl-threo form

To a solution of 73.7 parts of 85% potassium hydroxide in 750 parts by volume of absolute ethanol at 25° C. there is added 52.8 parts of gaseous methyl mercaptan over a period of thirty minutes. One hundred and eighty-nine parts of methyl 5-bromofuryl ketone is then added in in one portion. The reaction mixture is refluxed for a period of three hours, cooled and poured into 3000 parts by volume of water. The desired product, methyl (5-methyl-mercapto-2-furyl) ketone, is separated by extraction, collected, washed with water, dried and distilled under reduced pressure. The product has the formula

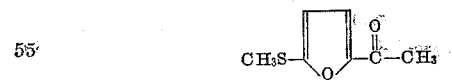

A mixture consisting of 134 parts of methyl (5-methyl-mercapto-2-furyl) ketone, 326 parts by volume of glacial acetic acid and 415 parts by volume of 30% hydrogen peroxide is heated on a steam bath for a period of two hours, cooled in an ice bath neutralized and extracted continuously over a 24 hour period with benzene. The extract is distilled to remove the benzene. The methyl (5-methylsulfonyl-2-furyl) ketone thus obtained is dried and crystallized from a 1:1 benzene-hexane mixture. It has the formula

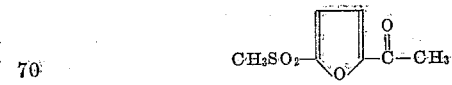

Bromomethyl (5-methylsulfonyl-2-furyl) ketone, the next step in my synthesis, is prepared according to the following procedure:

To a mixture of 131 parts of methyl (5-methylsulfonyl- 2-furyl) ketone and 285 parts by volume of glacial acetic acid there is added a few drops of bromine. There is a short induction period of approximately twenty minutes before the reaction begins. Bromine (112 parts) is added dropwise over a period of one hour to the reaction mixture which is maintained at a temperature of 16° C. The mixture is filtered. The product is collected, washed by slurrying with 1500 parts of water, filtered, air-dried and recrystallized from benzene. The product, bromomethyl (5-methylsulfonyl-2-furyl) ketone, has the formula

A mixture of 147 parts of bromomethyl (5-methylsulfonyl-2-furyl) ketone, 77 parts of hexamethylenetetramine and 700 parts by volume of ethylidene dichloride is stirred vigorously for a period of one hour. The product comprising N-(5-methylsulfonyl-2-furoylmethyl)-hexamethylenetetraminium bromide is collected by filtration, washed by slurrying twice with ether and air-dried. Its formula is as follows:

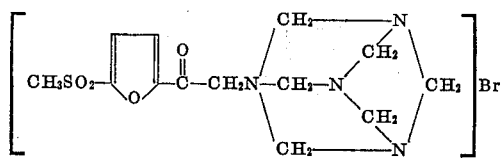

A vigorously stirred suspension consisting of 220 parts of N - (5 - methylsulfonyl - 2 - furoylmethyl) hexamethylenetetraminium bromide and 1000 parts of water at a temperature of from 10 to 15° C. is treated with a rapid stream of sulfur dioxide for a period of two hours. The reaction mixture is filtered and a solid is collected and dried. This solid is (hydroxymethylamino)methyl (5-methylsulfonyl-2-furyl) ketone sulfite and has the formula

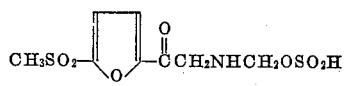

A mixture of 95 parts of (hydroxymethylamino)-methyl (5-methylsulfonyl-2-furyl) ketone sulfite, 200 parts by volume of concentrated hydrochloric acid and 400 parts by volume of absolute ethanol is refluxed for a period of one hour. The reaction mixture is reduced in volume to approximately 80 ml. by distillation under reduced pressure. It is then cooled. The product thus obtained is collected by filtration, washed by slurrying with a 1:1 mixture of absolute ethanol and ether and dried thoroughly at a temperature of 60° C. in a vacuum oven. The product, N-(5-methylsulfonyl-2-furoyl)methylamine hydrochloride, has the formula

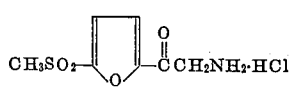

A mixture consisting of 57 parts of N-(5-methylsulfonyl-2-furoyl)methylamine hydrochloride and 150 parts of dichloroacetyl chloride is refluxed for a period of twenty minutes. It is then cooled and filtered. The resulting alpha,alpha - dichloro - N - (5 - methylsulfonyl - 2-furoylmethyl)acetamide is dried and recrystallized from ethylene dichloride. It has the formula

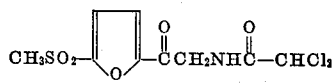

A mixture consisting of 44 parts of alpha,alpha-dichloro - N - (5 - methylsulfonyl - 2 - furoylmethyl)-acetamide, 17.4 parts of 36% aqueous formaldehyde, 1.7 parts of sodium bicarbonate and 450 parts by volume of methanol is stirred on a water-bath for a period of two hours while its temperature is maintained at from 40 to 45° C. The mixture is cooled in an ice bath and filtered. The resulting solid product, alpha,alpha-dichloro - N - [2 - hydroxy - (5 - methylsulfonyl - 2 - furoyl)ethyl]acetamide, is collected. Its formula is shown below:

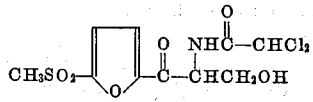

A mixture consisting of 20.6 parts of alpha,alpha-dichloro - N - [2 - hydroxy - (5 - methylsulfonyl - 2 - furoyl)ethyl]acetamide, 12.2 parts of redistilled aluminum isopropoxide and 1000 parts by volume of isopropanol is refluxed for a period of four hours. During this period approximately 500 parts of the solvent mixture (isopropanol-acetone) is removed by distillation. The remainder of the solvent is removed by distillation under reduced pressure. A yellow solid residue which remains is cooled and treated with 200 parts by volume of 2 N hydrochloric acid. The acid-treated residue which is (dl) - threo - 1 - (5 - methylsulfonyl - 2 - furyl) - 2 - (alpha,alpha-dichloroacetamido) - 1,3 - propanediol is recrystallized from ethyl acetate. This end product has the formula

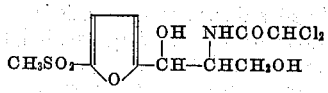

(dl)-threo form

*Example 2*

Preparation of (dl)-threo-1-(5-ethylsulfonyl-2-furyl)-2-(alpha,alpha-dichloroacetamido)-1,3-propanediol

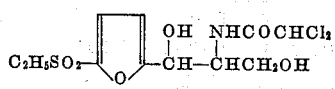

To a solution of 73.7 parts of 85% potassium hydroxide in 1000 parts by volume of absolute ethanol there is added 68.2 parts of ethyl mercaptan slowly. One hundred and eighty-nine parts of methyl (5-bromo-2-furyl) ketone is added in one portion and the resulting mixture is refluxed for a period of three hours, then cooled and poured into 3500 parts of water. The product consisting substantially of methyl (5-ethylmercapto-2-furyl) ketone is extracted with a solvent, washed, dried and distilled under reduced pressure. The product has the formula

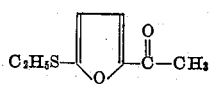

A mixture consisting of 151.3 parts of methyl (5-ethylmercapto-2-furyl) ketone, 340 parts by volume of glacial acetic acid and 425 parts by volume of 30% hydrogen peroxide is heated on a steam bath for a period of two hours. It is then cooled in an ice bath neutralized and continuously extracted with benzene over a 24 hour period. The benzene is removed from the extract by distillation. The product which remains is methyl (5-ethylsulfonyl-2-furyl) ketone. This product is then dried. Its formula is as follows:

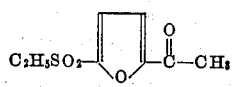

A mixture consisting of 153.5 parts of methyl (5-ethylsulfonyl-2-furyl) ketone and 300 parts by volume of glacial acetic acid is treated with a few drops of bromine. After a short induction period reaction begins. One hundred and twenty-one parts of bromine is then added dropwise over a period of one hour to the reaction mixture which is maintained at a temperature of 16° C. The mixture is stirred for an additional hour, sparged with dry nitrogen for one hour and filtered. The resulting product, bromomethyl (5-ethylsulfonyl-2-furyl) ketone, is collected, washed by slurrying twice with 1500 parts of water, filtered, dried and recrystallized from benzene. The product has the formula

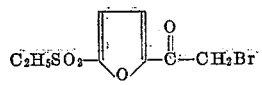

A mixture consisting of 163 parts of bromomethyl (5-ethylsulfonyl-2-furyl) ketone, 85.8 parts of hexamethylenetetramine and 800 parts by volume of ethylidene dichloride is vigorously stirred for a period of one hour. The resulting N-(5-ethylsulfonyl-2-furoylmethyl)hexamethylenetetraminium bromide is collected by filtration, washed twice with 500 ml. of ether and air-dried. This bromide has the formula

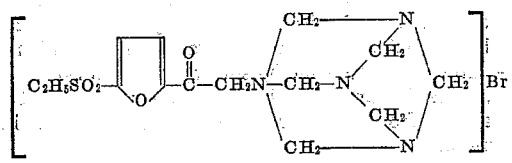

A vigorously stirred suspension consisting of 223 parts of N-(5-ethylsulfonyl-2-furoylmethyl)hexamethylenetetraminium bromide and 750 parts of water at a temperature of from 10 to 15° C. is treated with a rapid stream of sulfur dioxide over a two hour period. The product which is collected by filtration and dried consists of (hydroxymethylamino)methyl (5-ethylsulfonyl-2-furyl) ketone sulfite. The sulfite has the formula

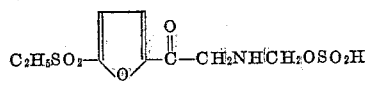

A mixture consisting of 112 parts of (hydroxymethylamino)methyl (5-ethylsulfonyl-2-furyl) ketone sulfite, 140 parts by volume of concentrated hydrochloric acid and 280 parts by volume of absolute ethanol is refluxed for a period of one hour. The reaction mixture is reduced in volume to approximately 75 parts by volume by distillation under reduced pressure and is then cooled. The resulting product, N-(5-ethylsulfonyl-2-furoyl)methylamine hydrochloride, is collected by filtration, washed with a 1:1 mixture of absolute ethanol and ether and dried thoroughly at a temperature of 60° C. in a vacuum oven. The product has the formula

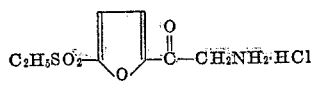

A mixture consisting of 60.7 parts of N-(5-ethylsulfonyl-2-furoyl)methylamine hydrochloride, 100 parts of dichloroacetyl chloride and 400 parts by volume of benzene is refluxed for a period of eighteen hours. It is then cooled, filtered and the alpha,alpha-dichloro-N-(5-ethylsulfonyl-2-furoylmethyl)acetamide thus produced is collected. It is washed with benzene, then with ether and recrystalized from ethylene dichloride. The substituted acetamide has the formula

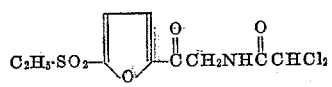

A mixture consisting of 39.4 parts of alpha,alpha-dichloro-N-(5-ethylsulfonyl-2-furoylmethyl)acetamide, 15 parts of 36% aqueous formaldehyde, 1.5 parts of sodium bicarbonate and 250 parts by volume of methanol is stirred for a period of two hours while the temperature of the mixture is maintained at 40-45° C. The mixture is then cooled in an ice-bath and filtered. The resulting alpha,alpha-dichloro-N-[2-hydroxy-(5-ethylsulfonyl-2-furoyl)ethyl]-acetamide has the formula

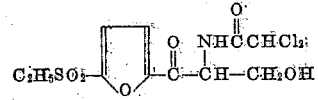

A mixture consisting of 17.1 parts of alpha,alpha-dichloro-N-[2-hydroxy-(5-ethylsulfonyl-2-furoyl)ethyl]-acetamide, 10.2 parts of redistilled aluminum isopropoxide and 450 parts by volume of isopropanol is refluxed for a period of four hours. During this period about 225 parts by volume of the solvent mixture (isopropanol-acetone) is removed by distillation. The remainder of the solvent is removed under reduced pressure to give a yellow residue. This is cooled and treated with 125 parts by volume of 2 N hydrochloric acid. The acid-treated material, which is the desired (dl)-threo-1-(5-ethylsulfonyl-2-furyl)-2-(alpha,alpha-dichloroacetamido)-1,3-propanediol, is collected by filtration and recrystallized from ethyl acetate. This final product has the formula

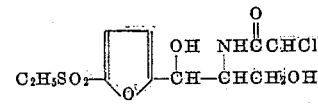

(dl)-threo form

Example 3

Preparation of (dl)-threo-1-(5-n-propylsulfonyl-2-furyl)-2-(alpha,alpha-dichloroacetamido)-1,3-propanediol

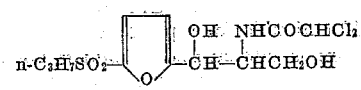

Methyl (5-n-propylmercapto-2-furyl) ketone, the starting material in this preparation, is produced according to the following method:

To a solution of 73.7 parts of 85% potassium hydroxide in 1000 parts by volume of absolute ethanol at 25° C. there is added 83.6 parts of n-propyl mercaptan. Methyl (5-bromo-2-furyl) ketone (189 parts) is added in one portion and the mixture is refluxed for a period of three hours. The mixture is then cooled and poured into 3000 parts of water. The resulting product is separated by extraction with benzene, collected, dried and distilled under reduced pressure. It has the formula

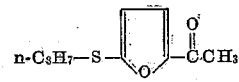

A mixture consisting of 150.9 parts of methyl (5-n-propylmercapto-2-furyl) ketone, 310 parts by volume of glacial acetic acid and 410 parts by volume of 30% hydrogen peroxide is heated on a steam bath for a period of two hours. The mixture is cooled in an ice-bath neutralized and extracted continuously with benzene over a period of 24 hours. The benzene is removed from the extract by distillation, the portion remaining being methyl (5-n-propylsulfonyl-2-furyl) ketone. It has the formula

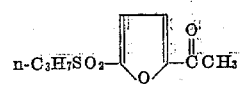

A mixture consisting of 144.7 parts of methyl (5-n-propylsulfonyl-2-furyl) ketone and 225 parts by volume of glacial acetic acid is treated with a few drops of bromine. An induction period of approximately twenty minutes elapses before the reaction begins. Bromine (107.2 parts) is added dropwise over a period of one hour to the reaction mixture, whose temperature is maintained at 16° C. The reaction mixture is stirred for an additional period of one hour, sparged with dry nitrogen and filtered. A product comprising bromomethyl (5-n-propylsulfonyl-2-furyl) ketone is collected, washed twice with 1500 parts of water, filtered, collected, dried and recrystallized from benzene. The product has the formula

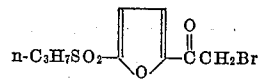

A mixture consisting of 153.4 parts of bromomethyl (5-n-propylsulfonyl-2-furyl) ketone, 72.8 parts of hexamethylenetetramine and 700 parts by volume of ethylidene dichloride is stirred vigorously for a period of one hour. The product which is obtained is N-(5-n-propylsulfonyl - 2 - furoylmethyl)hexamethylenetetraminium bromide. It is collected by filtration, washed twice with 500 parts by volume of ether and dried. The bromide has the formula

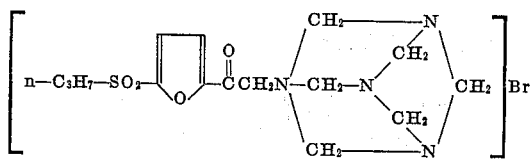

A vigorously stirred suspension consisting of 217 parts of N - (5 - n - propylsulfonyl-2-furoylmethyl)hexamethylenetetraminium bromide and 1000 parts of water at a temperature of from 10 to 15° C. is treated with a rapid stream of sulfur dioxide for a period of two hours. The resulting (hydroxymethylamino)methyl (5-n-propylsulfonyl-2-furyl) ketone sulfite is collected by filtration and dried. It has the formula

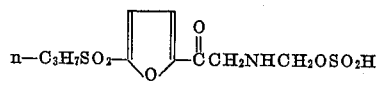

A mixture consisting of 113.8 parts of (hydroxymethylamino)methyl (5 - n - propylsulfonyl-2-furyl) ketone sulfite, 125 parts by volume of concentrated hydrochloric acid and 250 parts by volume of absolute ethanol is refluxed for a period of two hours. The reaction mixture is concentrated to approximately 100 parts by volume by distillation under reduced pressure and is then cooled. The desired product, N-(5-n-propyl-2-furoyl)methylamine hydrochloride, is collected by filtration, washed with a 1:1 mixture of absolute ethanol and ether and dried thoroughly at a temperature of 60° C. in a vacuum oven. The product has the formula

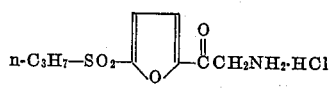

A mixture consisting of 58.7 parts of N-(5-n-propylsulfonyl-2-furoyl)methylamine hydrochloride, 100 parts of dichloroacetyl chloride and 500 parts by volume of dry benzene is refluxed for a period of eighteen hours, then cooled and filtered. The resulting product is collected, washed with benzene, then with ether and recrystallized from ethylene dichloride. The product, alpha,alpha-dichloro-N-(5-n-propylsulfonyl - 2 - furoylmethyl)acetamide, has the formula

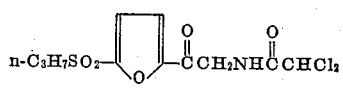

A mixture consisting of 37.6 parts of alpha-alpha-dichloro-N-(5-n-propylsulfonyl - 2 - furoylmethyl(acetamide, 13.3 parts of 36% aqueous formaldehyde, 1.3 parts of sodium bicarbonate and 250 parts by volume of methanol is stirred at a temperature of from 40 to 45° C. for a period of two hours, cooled in an ice-bath and filtered. The resulting alpha,alpha-dichloro-N-[2-hydroxy-(5-n-propylsulfonyl-2-furoyl)ethyl] acetamide has the formula

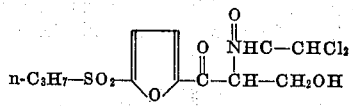

A mixture consisting of 18.6 parts of alpha,alpha-dichloro-N - [2 - hydroxy-5-n-propylsulfonyl-2-furoyl)-ethyl]-acetamide, 10.2 parts of redistilled aluminum isopropoxide and 350 parts by volume of isopropanol is refluxed for a period of four hours. During this period about 175 parts by volume of the solvent mixture (isopropanol-acetone) is removed by distillation. The remainder of the solvent is removed by distillation under reduced pressure to yield a yellow residue. The residue which comprises (dl)-threo-1-(5-n-propylsulfonyl - 2 - furyl) - 2 - (alpha,alpha-dichloracetamido)-1,3-propanediol is cooled and treated with 75 parts of 2 N-hydrochloric acid. The product is further purified by crystallizing it from ethyl acetate. The product has the formula

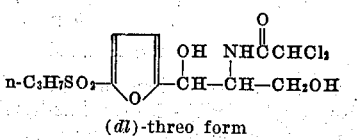

(dl)-threo form

Example 4

Preparation of (dl) - threo - 1 - (5-isopropylsulfonyl-2-furyl) - 2 - (alpha,alpha-dichloracetamido) - 1,3 - propanediol.

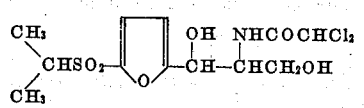

To a solution of 73.7 parts of 85% potassium hydroxide in 1000 parts of absolute ethanol at 25° C. there is added 83.6 parts of isopropyl mercaptan. One hundred and eighty-nine parts of methyl (5-bromo-2-furyl) ketone is next added in one portion. The resulting mixture is refluxed for a period of three hours, cooled and poured into 3000 parts of water. The desired methyl (5-isopropylmercapto-2-furyl) ketone is separated by extraction, dried and distilled under reduced pressure. This ketone has the formula

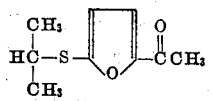

A mixture consisting of 147.2 parts of methyl (5-isopropylmercapto-2-furyl) ketone, 300 parts by volume of glacial acetic acid and 400 parts by volume of 30% hydrogen peroxide is heated on a steam bath for a period of two hours, cooled in an ice-bath neutralized and extracted with benzene continuously for a period of 24 hours. The extract containing methyl (5-isopropylsulfonyl-5-furyl) ketone is distilled to remove the benzene and the ketone, which remains is dried. It has the formula

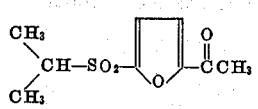

A mixture consisting of 136.1 parts of methyl (5-isopropylsulfonyl-2-furyl) ketone and 225 parts by volume of glacial acetic acid is treated with a few drops of bromine. After an induction period of about twenty minutes, the reaction begins. Bromine (100.8 parts) is added dropwise over a period of one hour to the reaction mixture which is maintained at a temperature of 16° C.

The mixture is stirred for an additional hour and sparged with dry nitrogen. The bromomethyl (5-isopropylsulfonyl-2-furyl) ketone so produced is collected by filtration and washed twice with 1200 parts of water, dried and recrystallized from benzene. This ketone has the formula

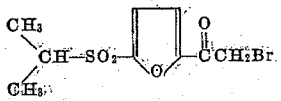

A mixture consisting of 138.6 parts of bromomethyl (5-isopropylsulfonyl-2-furyl) ketone, 65.9 parts of hexamethylenetetramine and 700 parts by volume of ethylidene dichloride is stirred vigorously for a period of one hour. The resulting N - (5 - isopropylsulfonyl - 2-furoylmethyl)hexamethylenetetraminium bromide is collected by filtration, washed twice with 500 parts by volume of ether and dried. The bromide has the formula

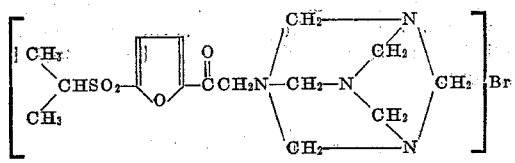

A vigorously stirred suspension consisting of 196 parts of N - (5 - isopropylsulfonyl - 2 - furylmethyl)hexamethylenetetraminum bromide and 800 parts of water at a temperature of 10 to 15° C. is treated with a rapid stream of sulfur dioxide for a period of two hours. A solid consisting of (hydroxymethylamino)methyl (5-isopropylsulfonyl-2-furyl) ketone sulfite is collected by filtration and dried. The sulfite has the formula

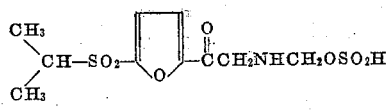

A mixture consisting of 94.3 parts of (hydroxymethylamino)methyl (5-isopropylsulfonyl-2-furyl) ketone sulfite and 225 parts by volume of absolute ethanol is treated with a stream of anhydrous hydrogen chloride for a period of one hour at reflux temperature. The reaction mixture is concentrated to approximately one-quarter its volume, cooled and filtered. The desired N-(5-isopropylsulfonyl - 2 - furoyl)methylamine hydrochloride is collected, washed with a 1:1 mixture of absolute ethanol-ether and dried thoroughly at a temperature of 60° C. in a vacuum oven. The hydrochloride has the formula

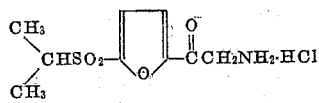

A mixture consisting of 48.1 parts of N-(5-isopropylsulfonyl-2-furoyl)methylamine hydrochloride, 100 parts of dichloroacetyl chloride and 500 parts by volume of dry benzene is refluxed for a period of eighteen hours, cooled, and filtered. The resulting alpha,alpha-dichloro-N-(5-isopropylsulfonyl-2-furoylmethyl)acetamide is collected and washed with 25 parts of benzene, then with ether and recrystallized from ethylene dichloride. This substituted acetamide has the formula

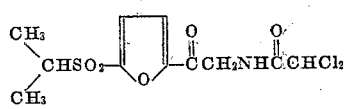

A mixture consisting of 28.1 parts of alpha,alpha-dichloro - N - (5-isopropylsulfonyl-2-furoylmethyl)acetamide, 10.0 parts of 36% aqueous formaldehyde, 1.0 part of sodium bicarbonate and 200 parts by volume of methanol is stirred at a temperature of 40–45° C. for a period of three hours, cooled in an ice-bath and filtered. The product obtained, alpha,alpha-dichloro-N-[2-hydroxy-(5-isopropylsulfonyl-2-furoyl)ethyl]acetamide, has the formula

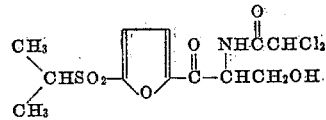

A mixture consisting of 13.4 parts of alpha,alpha-dichloro - N - [2 - hydroxy - (5 - isopropylsulfonyl - 2-furoyl)ethyl]acetamide, 7.3 parts of redistilled aluminum isopropoxide and 300 parts by volume of isopropanol is refluxed for a period of four hours. During this period approximately 150 parts by volume of the solvent mixture (isopropanol-acetone) is removed by distillation. The remainder of the solvent is removed by distillation under reduced pressure to give a yellow residue containing (dl)-threo-1-(5-isopropylsulfonyl-2-furyl) - 2 - (alpha, alpha-dichloroacetamido)-1,3-propanediol. The residue is cooled and treated with 75 parts of 2 N hydrochloric acid and finally recrystallized from ethyl acetate. The product has the formula

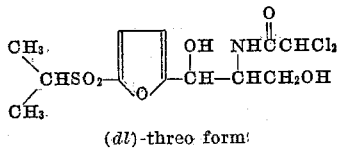

(dl)-threo form

Example 5

Preparation of (dl)-threo-1-(5-methylsulfonyl-2-furyl)-2-(alpha,alpha-dibromoacetamido)-1,3-propanediol.

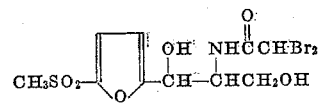

A mixture consisting of 60 parts of N-(5-methylsulfonyl-2-furoyl)methylamine hydrochloride prepared as in Example 1, 118 parts of dibromoacetyl chloride, and 300 parts by volume of toluene is refluxed for a period of five hours, then cooled and finally filtered. The product obtained is alpha,alpha-dibromo-N-(5-methylsulfonyl-2-furoylmethyl)acetamide. It is washed with benzene, then ether and dried. The product has the formula

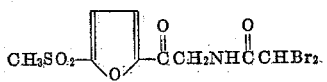

A mixture consisting of 40.3 parts of alpha,alpha-dibromo-N-(5-methylsulfonyl - 2 - furoylmethyl)acetamide, 12.5 parts of 36% aqueous formaldehyde, 1.3 parts of sodium bicarbonate and 225 parts by volume of methanol is stirred at a temperature of 40–45° C. for a period of two hours, cooled and filtered. A solid comprising alpha,alpha - dibromo - N - [2 - hydroxy - (5 - methylsulfonyl-2-furoyl)ethyl]acetamide is collected and dried. The product has the formula

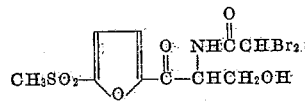

A mixture consisting of 15.2 parts of alpha,alpha-dibromo - N - [2 - hydroxy - (5 - methylsulfonyl - 2 - furoyl)ethyl]acetamide, 7.1 parts of redistilled aluminum isopropoxide and 300 parts by volume of isopropanol is refluxed for a period of four hours. During this period about 150 parts by volume of the solvent mixture (isopropanol-acetone) is removed by distillation. The remainder of the solvent is removed by distillation under reduced pressure to yield a yellow residue which is predominantly (dl)-threo-1-(5-methylsulfonyl-2-furyl)-2-(alpha,alpha-dibromoacetamido)-1,3-propanediol. It is cooled and treated with 70 parts of 2 N hydrochloric acid and recrystallized from ethyl acetate. The product has the formula

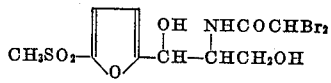

(dl)-threo form

I claim:
1. A compound of the formula

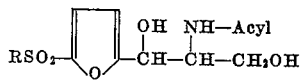

where R is a lower alkyl radical and acyl is a member of the group consisting of acetyl, chloroacetyl, bromoacetyl, dichloroacetyl, dibromoacetyl and alpha-methylsulfonylacetyl radicals.

2. (dl) - Threo - 1 - (5 - methylsulfonyl - 2 - furyl)- 2 - (alpha,alpha - dichloroacetamido) - 1,3 - propanediol.

3. (dl) - Threo - 1 - (5 - ethylsulfonyl - 2 - furyl)- 2 - (alpha,alpha - dichloroacetamido) - 1,3 - propanediol.

4. (dl) - Threo - 1 - (5 - n - propylsulfonyl - 2 - furyl)- 2 - (alpha,alpha - dichloroacetamido) - 1,3 - propanediol.

5. (dl) - Threo - 1 - (5 - isopropylsulfonyl - 2 - furyl)- 2 - (alpha,alpha - dichloroacetamido) - 1,3 - propanediol.

6. (dl) - Threo - 1 - (5 - methylsulfonyl - 2 - furyl)- 2 - (alpha,alpha - dibromoacetamido) - 1,3 - propanediol.

7. In a process for preparing a compound of claim 1, the steps comprising oxidizing a compound of the formula

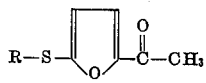

where R is a lower alkyl radical with hydrogen peroxide and glacial acetic acid to obtain a compound of the formula

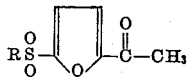

brominating the latter compound, recovering a compound of the formula

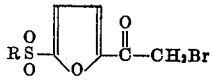

reacting the latter compound with hexamethylenetetramine to obtain N-[5-(lower alkyl)sulfonyl-2-furoylmethyl]hexamethylenetetraminium bromide, reacting the latter compound with sulfurous acid to obtain a sulfite of the formula

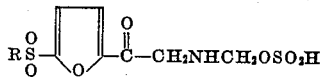

hydrolyzing the latter compound with hydrochloric acid to obtain a hydrochloride of the formula

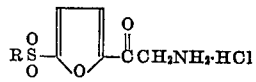

acylating the latter compound, recovering a compound of the formula

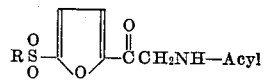

where acyl is a member of the class consisting of acetyl, chloroacetyl, bromoacetyl, dichloroacetyl, dibromoacetyl and alpha-methylsulfonylacetyl radicals, thus formed, reacting the latter product with formaldehyde in the presence of a weak base to obtain a compound of the formula

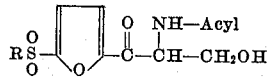

reacting the latter compound with a member of the group consisting of aluminum isopropoxide and sodium borohydride, and recovering a compound of the formula

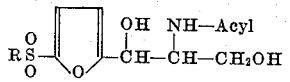

8. In a process for obtaining (dl)-threo-1-(5-methylsulfonyl - 2 - furyl) - 2 - (alpha,alpha - dichloroacetamido)-1,3-propanediol, the steps comprising reacting methyl (5-methylmercapto-2-furyl) ketone with hydrogen peroxide in the presence of glacial acetic acid, recovering methyl (5-methylsulfonyl-2-furyl) ketone thus formed, brominating the latter compound with liquid bromine in the presence of glacial acetic acid to obtain bromomethyl (5-methylsulfonyl-2-furyl) ketone, reacting the latter compound with hexamethylenetetramine to obtain N-(5 - methylsulfonyl - 2 - furoylmethyl)hexamethylenetetramine bromide, reacting the latter compound so obtained with sulfur dioxide and water, recovering (hydroxymethylamino)methyl (5-methylsulfonyl-2-furyl) ketone sulfite, reacting the latter compound so obtained with hydrochloric acid, recovering N-(5-methylsulfonyl-2-furoyl)methylamine hydrochloride, reacting the latter compound with dichloroacetyl chloride to obtain alpha, alpha - dichloro - N - (5 - methylsulfonyl - 2 - furoylmethyl)-acetamide, reacting the latter compound so obtained with aqueous formaldehyde in a dilute alkaline solution, recovering alpha,alpha - dichloro - N - [2-hydroxy - (5 - methylsulfonyl - 2 - furoyl)ethyl]acetamide, reducing the latter compound with aluminum isopropoxide in the presence of isopropyl alcohol, and recovering (dl) - threo - 1 - (5 - methylsulfonyl - 2 - furyl)- 2 - alpha,alpha - dichloroametamido) - 1,3 - propanediol.

References Cited in the file of this patent
UNITED STATES PATENTS

| | | |
|---|---|---|
| 2,515,241 | Long | July 18, 1950 |
| 2,547,712 | Long | Apr. 3, 1951 |
| 2,562,107 | Long | July 24, 1951 |

FOREIGN PATENTS

| | | |
|---|---|---|
| 512,433 | Belgium | July 15, 1952 |
| 828,549 | Germany | Jan. 17, 1952 |

OTHER REFERENCES

Keskin et al., J. Org. Chem., vol. 16, No. 9, pp. 1333–36, 1951.

Cutler et al., J. A. C. S. 74, pp. 5475–81 (received June 2, 1952).